(12) United States Patent
Itadani et al.

(10) Patent No.: US 8,728,363 B2
(45) Date of Patent: May 20, 2014

(54) THERMOPLASTIC RESIN FOAM AND PRODUCTION PROCESS THEREOF

(75) Inventors: Toru Itadani, Tokyo (JP); Masaaki Ono, Tokyo (JP)

(73) Assignee: Asahi Fiber Glass Co., Ltd., Tokyo (JP)

( * ) Notice: Subject to any disclaimer, the term of this patent is extended or adjusted under 35 U.S.C. 154(b) by 0 days.

(21) Appl. No.: 13/269,158

(22) Filed: Oct. 7, 2011

(65) Prior Publication Data

US 2012/0091612 A1    Apr. 19, 2012

Related U.S. Application Data

(62) Division of application No. 12/246,978, filed on Oct. 7, 2008, now abandoned.

(30) Foreign Application Priority Data

Oct. 15, 2007  (JP) ................................ 2007-268372

(51) Int. Cl.
  *B29C 47/30* (2006.01)
(52) U.S. Cl.
  USPC .......... 264/46.1; 364/41; 364/45.8; 364/45.9; 425/464
(58) Field of Classification Search
  USPC ................ 264/41, 45.8, 45.9, 46.1
  See application file for complete search history.

(56) References Cited

U.S. PATENT DOCUMENTS

| 3,720,572 A | 3/1973 | Soda et al. |
| 3,867,493 A * | 2/1975 | Seki .............................. 264/45.9 |
| 3,881,984 A * | 5/1975 | Soda et al. .................... 156/500 |
| 3,920,876 A | 11/1975 | Albert et al. |
| 3,993,721 A | 11/1976 | Soda et al. |
| 5,997,781 A | 12/1999 | Nishikawa et al. |
| 2005/0058824 A1 | 3/2005 | Fujimoto |
| 2009/0053506 A1 | 2/2009 | Fujimoto |

FOREIGN PATENT DOCUMENTS

| CN | 1170662 A | 1/1998 |
| CN | 1575952 A | 2/2005 |
| EP | 1767332 | * 3/2007 |
| EP | 1767332 A1 | 3/2007 |

(Continued)

OTHER PUBLICATIONS

European Search Report for European Patent Application No. 08017650.6 (Mar. 3, 2009).

(Continued)

*Primary Examiner* — Yogendra Gupta
*Assistant Examiner* — Robert J Grun
(74) *Attorney, Agent, or Firm* — Kenealy Vaidya LLP

(57) ABSTRACT

A die plate for a die block can have a coat-hanger-shaped flow path for extruding a molten foamable thermoplastic resin in a form of a sheet. The die plate can be on a downstream side of the coat-hanger-shaped flow path to make a flow rate of the molten foamable thermoplastic resin uniform in a width direction. The die plate can have a multiplicity of delivery apertures. The delivery apertures in opposite side regions can have a diameter greater than a diameter which the delivery apertures in a center region have. A die unit can include a die block, which has a multiple bifurcated manifold terminating in plural coat-hanger-shaped flow paths at downward ends thereof, and a like plural number of similar die plates as described above. A process for producing a wide thermoplastic resin foam can use the die unit.

13 Claims, 3 Drawing Sheets

(56) References Cited

FOREIGN PATENT DOCUMENTS

| | | |
|---|---|---|
| GB | 1 408 281 | 10/1975 |
| GB | 1 492 670 | 11/1977 |
| JP | 1502252 T | 8/1989 |
| JP | 2003-311806 A | 11/2003 |
| WO | 88/06094 A1 | 8/1988 |
| WO | 2006/102143 A2 | 9/2006 |

OTHER PUBLICATIONS

Singapore Office Action for Singapore Patent Application No. 200807639-0 dated Dec. 14, 2011.
Office Action from Chinese Patent App. No. 200810170024.6 (Jul. 11, 2013).

* cited by examiner

THERMOPLASTIC RESIN FOAM AND PRODUCTION PROCESS THEREOF

CROSS-REFERENCE TO RELATED APPLICATION

This application is a divisional of, and claims priority under 35 U.S.C. 120 to, U.S. patent application Ser. No. 12/246,978 filed on Oct. 7, 2008 now abandoned, the disclosure of which is hereby incorporated herein in its entirety. This application also claims the priority of Japanese Patent Application 2007-268372 filed Oct. 15, 2007, which is incorporated herein by reference.

FIELD OF THE INVENTION

This invention relates to a coalesced-strand thermoplastic resin foam, which is free of waviness and is excellent in thickness uniformity, and also to a die plate, die unit and process for its production.

BACKGROUND ART

There have been conventionally known foams each obtained by causing a thermoplastic resin to pass through a die having plural delivery apertures therein to form foamed strands and then coalescing them together. For example, JP-A-1-502252 discloses a process of producing a foam structure, which comprises extruding a molten foamable thermoplastic composition through a die plate having an array of plural orifices or slits (delivery apertures) arranged such that adjacent strands or profiles extruded therethrough contact and coalesce to form a foam structure in which the strands or profiles are disposed substantially parallel to the longitudinal axis of the foam.

JP-A-2003-311806 discloses a method for making the delivery of a resin uniform in a width direction by arranging a multiple bifurcated manifold in an upstream section of an extrusion nozzle and providing the multiple bifurcated manifold with coat-hanger-shaped, flow rectification mechanisms at downstream ends thereof. Each of these coat-hanger-shaped, flow rectification mechanisms defines a resin flow path having a reduced cross-sectional area at a central part thereof and flared in a downward direction at opposite sides thereof such that a flow rate can be made uniform in a width direction of the thus-flared resin flow path.

In JP-A-1-502252, however, a thermoplastic resin needs to be extruded in the form of strands through the respective delivery apertures by an extruder when it is desired to produce a sheet-shaped or board-shaped foam having a relatively large width. As the product to be obtained is wide compared with a flow passage for the resin extruded from the extruder, the product is accompanied by a problem in that the product is thinner at opposite side regions thereof than at a central region thereof.

JP-A-2003-311806 describes to uniformly extrude a resin with a large width from a resin extruder by using a coat hanger die. However, an attempt to extrude a thermoplastic resin in the form of strands through the coat hanger die and the die plate disclosed in JP-A-1-502252 and having the array of delivery apertures involves a problem in that the product becomes thinner at its opposite side areas than at its central area, because the product to be obtained has a large width.

If a product has a smaller thickness at its opposite side areas than at its central area, the product involves not only a problem of inferior heat-insulating performance at such side areas but also a problem in the applicability to a building frame.

These problems may be solved by trimming off the opposite side areas. This solution, however, is accompanied by problems. Described specifically, it takes time for the trimming and also for removing the trimmings so cut off, and therefore, is not preferred from standpoint of work efficiency. Unless the trimmed-off resin can be recycled, it has to be thrown away. These problems become particularly serious when the expansion ratio is 10 times or larger, because such a large expansion ratio tends to develop differences in the thickness of the resulting foam and hence to lead to wider cut-off trimmings.

On the other hand, JP-A1-2005-115720 discloses an extrusion die for extruding a thermoplastic resin. This extrusion die has coat-hanger-shaped spreading portions connected to respective downward outlets of a multiple bifurcated resin manifold, a resin holding portion arranged on a downstream side of these spreading portions, and a disturbed-flow-producing means arranged at the resin holding portion to reduce differences in the flow rate of the thermoplastic resin in a width direction and to make the flow rate uniform in the width direction. As examples of the disturbed-flow-producing means, a coil spring, a breaker equipped with a number of small holes, a rotor equipped with a number of shear blades or agitation blades, and a slit plate with a number of slits formed therein. It is considered desirable to arrange a means for making a flow rate uniform in a width direction because, when the flow of the resin from any one of the coat-hanger-shaped spreading portions is observed, the flow rate is not uniform in the width direction. Disturbance to the flows of the resin from the coat-hanger-shaped spreading portions is, however, not preferred for obtaining a uniform foam.

SUMMARY OF THE INVENTION

When a resin is fed and extruded through a single extruder to obtain a relatively wide, sheet-shaped or board-shaped foam of extruded strands, a problem arises in that the feeding of the resin tends to become insufficient especially at the opposite sides and the resulting foam becomes non-uniform in thickness. This problem becomes pronounced especially when the width of a foam becomes 500 mm or greater, and cannot be fully overcome even when the extrusion die disclosed in JP-A-2003-311806 or JP-A-2005-115720 referred to in the above is employed. Objects of the present invention are, therefore, to provide a thermoplastic resin foam excellent in thickness and a die plate, die unit and process for the production of the thermoplastic resin foam.

As a result of an enthusiastic investigation, the present inventors have found that the flow rate of a resin can be made uniform on the downstream side of each coat-hanger-shaped spreading portion, in other words, each coat-hanger-shaped flow path by arranging, on the downstream side of the coat-hanger-shaped flow path, a die plate having a multiplicity of delivery apertures the diameters of which are greater in opposite side regions and in a center region, leading to the present invention. The above-described objects can be achieved by the present invention to be described hereinafter. Described specifically, in a first aspect of the present invention, there is provided a die plate for a die block having a coat-hanger-shaped flow path for extruding a molten foamable thermoplastic resin in a form of a sheet, said die plate being to be arranged on a downstream side of the coat-hanger-shaped flow path to make a flow rate of the molten foamable thermoplastic resin uniform in a width direction, wherein the die plate is provided with a multiplicity of delivery apertures, and in the delivery apertures, the delivery apertures in opposite side regions have a diameter greater than a diameter which the delivery apertures in a center region have.

In a second aspect of the present invention, there is also provided a die unit composed of a die block and plural die plates, said die block having a multiple bifurcated manifold terminating in a like plural number of coat-hanger-shaped flow paths at downward ends thereof to permit extrusion of a molten foamable thermoplastic resin in a form of a wide sheet, and said die plates being to be arranged corresponding to the respective coat-hanger-shaped flow paths on downstream sides of the coat-hanger-shaped flow paths to make a flow rate of the molten foamable thermoplastic resin uniform in a width direction on the downstream sides of the coat-hanger-shaped flow paths, wherein the die plates are each provided with a multiplicity of delivery apertures, and in the delivery apertures, the delivery apertures in opposite side regions have a diameter greater than a diameter which the delivery apertures in a center region have.

In a third aspect of the present invention, there is also provided a process for producing a wide thermoplastic resin foam by feeding a molten foamable thermoplastic resin through a multiple bifurcated manifold terminating in plural coat-hanger-shaped flow paths at downward ends thereof, extruding the molten foamable thermoplastic resin as foamed strands through the coat-hanger-shaped flow paths, and then coalescing the foamed strands together, wherein the foamed strands are extruded through delivery apertures formed in plural die plates arranged corresponding to the respective coat-hanger-shaped flow paths on downstream sides of the coat-hanger-shaped flow paths; and in each of the plural die plates, the delivery apertures in opposite side regions have a diameter greater than a diameter, which the delivery apertures in a center region have, to make a flow rate of the molten foamable thermoplastic resin uniform in a width direction on the downstream sides of the coat-hanger-shaped flow paths.

In a fourth aspect of the present invention, there is also provided a wide thermoplastic resin foam having an expansion ratio of at least 10 times, a width of 500 mm to 2,500 mm, a thickness of at least 5 mm and a width/thickness ratio of at least 10, and the percentage of a minimum thickness of the foam being at least 90% based on a maximum thickness of the foam.

According to the present invention, there can be provided a thermoplastic resin foam which is free of waviness in the width direction of the foam and is excellent in thickness uniformity, and a die plate, die unit and process of its production.

DETAILED DESCRIPTION OF THE INVENTION AND PREFERRED EMBODIMENTS

In the die plate according to the first aspect of the present invention, the die unit according to the second aspect of the present invention and the production process according to the third aspect of the present invention, the ratio of the diameter of the delivery apertures in the opposite side regions to the diameter of the delivery apertures in the center region may preferably be 1.05 to 1.40; the delivery apertures in the opposite side regions may preferably be located within ranges of 30%, based on a width of the die plate, from opposite side edges of the die plate; the percentage of a minimum resin delivery rate per delivery aperture based on a maximum resin delivery rate per delivery aperture may preferably be 80% to 100%; the delivery apertures may preferably be arranged in horizontal arrays; and boundary regions may preferably be arranged between the opposite side regions and the center region, respectively, and the delivery apertures in the opposite side regions, the delivery apertures in the boundary regions and the delivery apertures in the center region satisfy the following equation:

$$\alpha > \gamma > \beta$$

wherein
    α: Diameter of the delivery apertures in the opposite side regions,
    β: Diameter of the delivery apertures in the center region, and
    γ: Diameter of the delivery apertures in the boundary regions.

In the die unit according to the second aspect of the present invention, the coat-hanger-shaped flow paths and the die plates may preferably be arranged as many as 2 to 16, respectively; the coat-hanger-shaped flow paths may preferably have a width of 130 to 450 mm at downstream ends thereof; and the plural die plates may each preferably satisfy the following conditions:

$$D1 \geq 2\text{mm, and}$$

$$W1/D1 \geq 10$$

wherein
    D1: Total height of the delivery apertures in each die plate, and
    W1: Total width of the plural die plates.

According to the third embodiment of the first aspect of the present invention, there is also provided an elongated die plate for a die block having plural coat-hanger-shaped flow paths for extruding a molten foamable thermoplastic resin in a form of a wide sheet, said elongated die plate being to be arranged on downstream sides of the coat-hanger-shaped flow paths to make a flow rate of the molten foamable thermoplastic resin uniform in a width direction on downstream sides of the coat-hanger-shaped flow paths, comprising a like plural number of die plates as defined above integrated in the width directions such that the plural number of die plates correspond to the coat-hanger-shaped flow paths, respectively. In the above-described die unit according to the second aspect of the present invention and the production process according to the third aspect of the present invention, the plural die plates can comprise the above-described elongated die plate.

Figure 1:
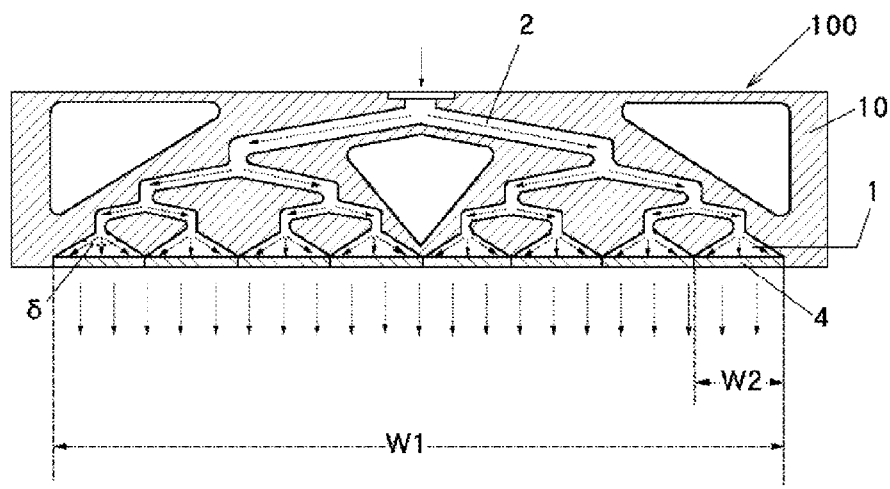
FIG. 1 is a schematic cross-sectional view of a die unit according to a first embodiment of the first aspect of the present invention taken in the direction of arrows I-I of FIG. 2 for describing the process of the present invention for the production of a thermoplastic resin foam.
Figure 5:
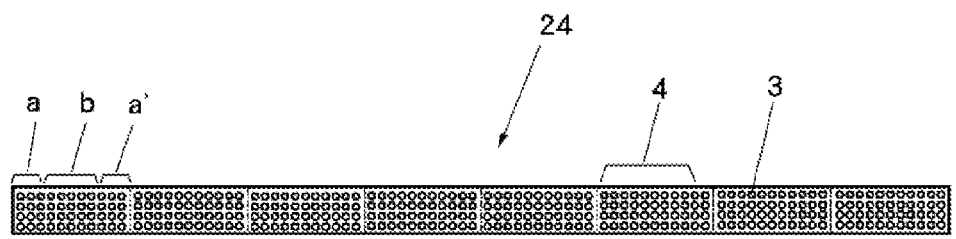
FIG. 5 is a front view of an elongated die plate according to a third embodiment of the first aspect of the present invention.

The present invention will next be described in further detail based on best modes for carrying it out. As illustratively shown in FIG. 1, the process of the present invention for the production of a thermoplastic resin foam feeds a molten foamable thermoplastic resin through a multiple bifurcated manifold 2 formed in a die block 10 and terminating in plural coat-hanger-shaped flow paths 1 at downward ends thereof, extrudes the molten foamable thermoplastic resin as foamed strands through the coat-hanger-shaped flow paths 1, and then coalesces the foamed strands together into a wide thermoplastic resin foam. The process is characterized in that the foamed strands are extruded through numerous delivery apertures 3 formed in plural die plates 4 arranged corresponding to the respective coat-hanger-shaped flow paths 1 on downstream sides of the coat-hanger-shaped flow paths 1; and that in each of the plural die plates, the delivery apertures 3 in opposite side regions a,a' have a diameter α greater than a diameter β, which the delivery apertures 3 in a center region b have, to make a flow rate of the molten foamable thermoplastic resin uniform in a width direction on the downstream sides of the coat-hanger-shaped flow paths 1. It is to be noted that the die block 10 and the plural die plates 4 make up a die unit 100. The total width W1 of the plural die plates 4 can be, for example, 500 to 2,500 mm. According to this process, the delivery rate of the molten resin is made uniform over the entire width of all the die plates 4, thereby making it possible to obtain a foam which is free of waviness and is uniform in thickness. It is to be noted that the die unit 100 can be constructed by arranging one die plate 4 for every coat-hanger-shaped flow path 1 (specifically, eight die plates 4 when the die unit 100 has eight coat-hanger-shaped flow paths 1) (FIG. 1). As depicted in FIG. 5 as an alternative, an elongated die plate 24 can be formed by integrating die plates 4, which are each provided with a multiplicity of delivery apertures 3, as many as the number of the coat-hanger-shaped flow paths 1 in a width direction such that the die plates 4 correspond to the respective coat-hanger-shaped flow paths 1.

In the foregoing, the number of the coat-hanger-shaped flow paths 1 and the number of the die plates 4 are each 2 to 16 in general. It is to be noted that, although the number of the coat-hanger-shaped flow paths 1 and the number of the die plates 4 are each 8 in the first embodiment shown in FIG. 1, the present invention shall not be limited by FIG. 1. The objects of the present invention cannot be achieved if a die unit has only one coat-hanger-shaped flow path 1 and one die plate 4. If the number of coat-hanger-shaped flow paths 1 and the number of die units 4 each exceed 16, effects of shear force on a flow of a molten resin become significant so that the resin may fail to undergo sufficient foaming or the productivity of foams may drop. The more preferred numbers of coat-hanger-shaped flow paths 1 and die plates 4 are each 2 to 10.

The width W2 of each coat-hanger-shaped flow path 1 at the downstream end thereof can preferably be 130 to 450 mm. A width W2 smaller than 130 mm unavoidably in an increase in the number of coat-hanger-shaped flow paths 1 so that the effects of shear force on a flow of a molten resin become significant. As a result, the resin may fail to undergo sufficient foaming or the productivity of foams may drop, or it may become necessary to intricately vary the diameters of the delivery apertures 3 in the respective die plates 4. Widths W2 smaller than 130 mm are therefore not preferred. A width greater than 450 mm, on the other hand, makes it difficult to allow a resin to flow uniform so that the resulting foam may develop waviness or may be impaired in the dimensional accuracy of its thickness. Widths W2 greater than 450 are therefore not preferred either. A more preferred width W2 is 200 to 400 mm. Further, the inlet angle δ of each coat-hanger-shaped flow path 1 may be preferably 90 to 180°, more preferably 120 to 160°.

It is also preferred that the total height D1 of the delivery apertures 3 in each die plate 4 is at least 2 mm and that, when the total width of the delivery apertures 3 in the plural die plates 4 is represented by W1, W1/D1 is at least 10. With a total height D1 smaller than 2 mm, the effects of melt fractures characteristic to the extrusion of a high-viscosity resin such as polypropylene resin useful in the present invention can no longer be ignored, and as a result, the dimensional accuracy of the thickness is deteriorated. Total widths smaller than 2 mm are therefore not preferred. If W1/D1 is smaller than 10, the total height D1 becomes extremely large relative to a total width W1 of 500 to 2,500 mm. As a consequence, the resulting foam is hardly provided with smoothness, or after the foaming, a longer time is needed until the resin inside the foam hardens, and as a result, the foam undergoes shrinkage and the resulting product is hardly provided with a high expansion ratio. W1/D1 ratios smaller than 10 are therefore not preferred. More preferred D1 is 5 to 70 mm, while more preferred W1/D1 is 10 to 800.

Figure 2:
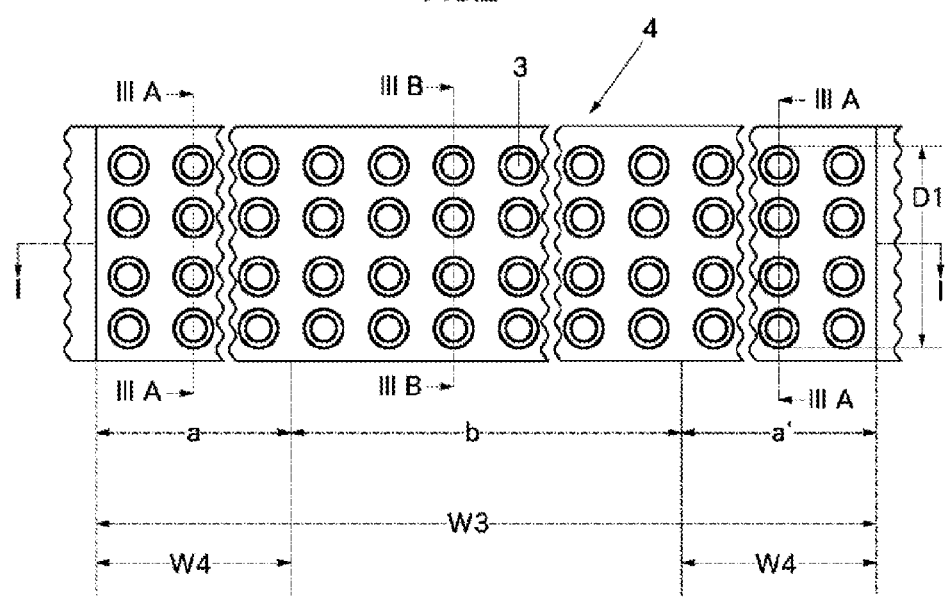
FIG. 2 is a fragmentary front view of the die unit of FIG. 1, and shows one of plural die plates according to a first embodiment of the first aspect of the present invention in the die unit of FIG. 1.

The delivery apertures 3 in the present invention may be arrayed in a lattice-like pattern as shown in FIG. 2, or may be obliquely arrayed in a honeycomb (zigzag) pattern. When arrayed in a lattice-like pattern, the resulting foam becomes a high-flexibility product. When arrayed in a honeycomb pattern, on the other hand, the resulting foam becomes a product of high bending strength.

Figure 3A:
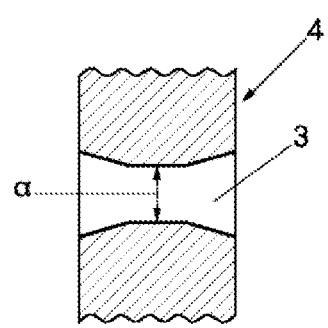
FIG. 3A is a fragmentary cross-sectional view of the die plate of FIG. 2 taken in the direction of arrows IIIA-IIIA of FIG. 2.
Figure 3B:
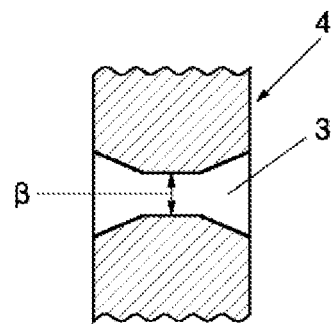
FIG. 3B is a fragmentary cross-sectional view of the die plate of FIG. 2 taken in the direction of arrows IIIB-IIIB of FIG. 2.

FIG. 2 is a fragmentary front view of the die unit 100 of FIG. 1, and illustrates one of the die plates 4. The delivery apertures 3 arranged in the die plate 4 illustrated in FIG. 2 may preferably be set such that as depicted in FIGS. 3A and 3B, the delivery apertures 3 in opposite side regions a,a' have a diameter a greater than a diameter β which the delivery apertures 3 in a center region b have. Preferably, α/β may be set at 1.05 to 1.40. In general, the delivery rate of a resin is lower through the delivery apertures 3 in each die plate 4, said delivery apertures being located in opposite side areas (the side regions a,a'), so that the resulting foam tends to become thinner at boundary areas between the adjacent die plates 4. When α/β is set as described above, it is possible to compensate for this tendency and to obtain a foam having a uniform thickness. α/β ratios smaller than 1.05 cannot bring about the above-described effect, while α/β ratios greater than 1.40 lead to foams each of which has an increased thickness at the boundary areas between the adjacent die plates 4. α/β ratios outside the above range are therefore not preferred. More preferred α/β is 1.05 to 1.25.

The widths W4 of the opposite side regions a,a' may preferably extend over ranges of 30%, based on the width (W3) of the die plate (4), from the opposite side edges of the die plate (4), in other words, may preferably satisfy the following equation: $0 < W4 \leq (0.3 \times W3)$. By setting the widths W4 of the side regions a,a' as described above, the thickness of the resulting foam may be rendered more uniform at the boundary areas between the adjacent die plates 4.

Figure 4:
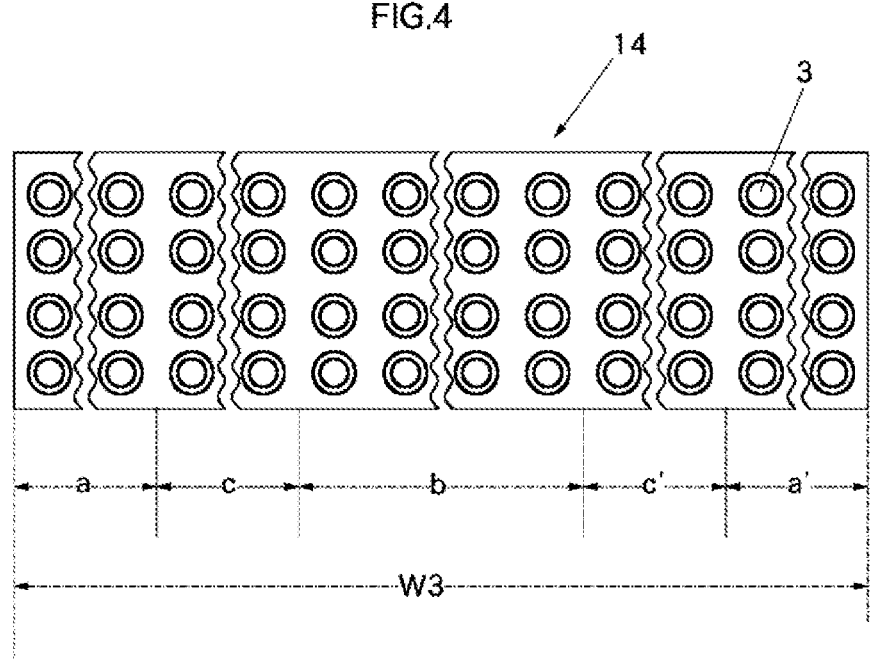
FIG. 4 is a fragmentary front view similar to FIG. 2, and illustrates one of plural die plates according to a second embodiment of the first aspect of the present invention.

Die plates for use in the present invention can also be formed such that as a die plate 14 depicted in FIG. 4, boundary regions c,c' are arranged between opposite side regions a,a' and a center region b, respectively, and delivery apertures 13 in the opposite side regions a,a', delivery apertures 13 in the boundary regions c and c' and delivery apertures 13 in the center region (b) satisfy the following equation:

$$\alpha > \gamma > \beta$$

wherein
α: Diameter of the delivery apertures 13 in the opposite side regions a, a', β: Diameter of the delivery apertures 13 in the center region b, and γ: Diameter of the delivery apertures 13 in the boundary regions c,c' (also see FIGS. 3A and 3B).

It is to be noted that no particular limitation is imposed on the positions of these boundary regions c,c' insofar as they are located between the side regions a,a' and the center region b.

By setting the percentage of a minimum resin delivery rate per delivery aperture 3 or 13 at 80% to 100% based on a maximum resin delivery rate per delivery aperture 3 or 13 (by setting the difference between the minimum resin delivery rate and the maximum resin delivery rate within 20% based on the maximum resin delivery rate), similar advantageous effects as described above can be obtained.

No particular limitation is imposed on the resin for use in the present invention. Examples include polypropylene resin, polyethylene resin, polyester resins, polylactic acid resin, polyamide resins, and the like. They can be used either singly or in combination. These resins may be either crosslinked or uncrosslinked. With crosslinked resins, the present invention can reduce trimmings. With uncrosslinked resins, on the other hand, recycling is feasible even when trimmings are formed a little.

As uncrosslinked resins, propylene homopolymer, propylene-ethylene copolymers formed primarily of propylene, and blended resins of polypropylene-based resins and polyethylene-based resins, all of which have relatively large molecular weights, can be preferably used for their excellent extrusion foamability and the superb properties of foams available from them.

Polypropylene-based resins can be suitably adopted because, even when uncrosslinked propylene homopolymer especially unsuited for a high expansion ratio is employed, a foam available as a result of the practice of the production process under specific conditions can be provided with a high expansion ratio and also with a uniform thickness. A description will hereinafter be made about the use of polypropylene-based resins including uncrosslinked polypropylene-based resins as specific examples.

As the uncrosslinked polypropylene-based resin, it is preferred to use one having a melt tension (MT) of 5 to 30 g at 230° C. It is to be noted that a melt tension can be determined at a measurement temperature of 230° C., an extrusion speed of 10 mm/min and a take-up speed of 3.1 m/min by using a capirograph. A melt tension lower than 5 g is susceptible to cell collapse upon foaming, while a melt tension higher than 30 g does not permit any sufficient cell growth upon foaming. The melt tension may be preferably 6.5 to 20 g, more preferably 7.5 to 10 g.

Further, the above-described uncrosslinked polypropylene-based resin may preferably satisfy the following equation (I):

$$\mathrm{Log}(MT) > -1.33\ \mathrm{log}(MFR) + 1.2 \quad\quad\quad (I)$$

wherein

MT: Melt tension at 230° C. as defined above, and

MFR: Melt flow rate at 230° C.

An uncrosslinked polypropylene resin or an uncrosslinked polypropylene resin containing plural thermoplastic resins is extremely suited when its melt tension and MFR satisfy the above-described equation (I), because the melt flowability of the resin increases concurrently with its melt tension, the resin pressure can be appropriately maintained upon extrusion for foaming, cell walls are allowed to undergo sufficient extension upon foaming, and a foam of a high expansion ratio can be readily obtained.

As a foaming agent, an inorganic inert gas such as carbon dioxide or nitrogen, a hydrocarbon-based gas such as butane or pentane, flon gas or an alternate flon gas can be mentioned. To obtain a foam of a high expansion ratio of 10 times or greater by foaming the uncrosslinked polypropylene-based resin with an inorganic inert gas, it is preferred to cause the foaming solely with a gas in a supercritical state. When an inorganic inert gas is used, carbon dioxide the critical pressure of which is relatively low is most preferred. When carbon dioxide in a supercritical state is used, it is suitable to cause the foaming of a thermoplastic resin by using preferably 4 to 20 parts by weight, particularly preferably 5 to 15 parts by weight of carbon dioxide per 100 parts by weight of the thermoplastic resin. Use of carbon dioxide in an amount smaller than 4 parts by weight tends to result in a lower expansion ratio, while its use in an amount greater than 20 parts by weight tends to form large voids due to excess carbon dioxide in the resulting foam. It is, therefore, not preferred to use carbon dioxide in an amount outside the above-described range. When foaming is performed with a hydrocarbon-based gas, flon gas or an alternative flon gas, the foaming can be effected preferably by adding the foaming agent as much as 3 to 30 parts by weight, which can give a gas amount sufficient to maintain a suitable resin pressure.

The foam according to the present invention can be produced by using an extruder and the die unit of FIG. 1 attached to a free end of the extruder, mixing carbon dioxide, which is specifically in a supercritical state, as a foaming agent in an uncrosslinked polyolefin resin composition containing an uncrosslinked polypropylene resin of the above-described physical properties, and melting and extruding the resin composition at a temperature of 160 to 250° C.

A melting and extrusion temperature lower than 160° C. is not preferred because the dissolution or diffusion of supercritical carbon dioxide into the resin is reduced or the extensibility of the resin upon foaming is insufficient to result in a reduced expansion ratio. On the other hand, a melting and extrusion temperature higher than 250° C. is not preferred either because a deterioration such as molecular chain scission of the polypropylene-based resin under heat or a heat shrinkage caused by a delay in cooling and solidification after foaming begins to take place. The resin temperature shortly before the foaming may be preferably 160 to 210° C., more preferably 170 to 200° C., most preferably 180 to 190° C.

To provide a foam with a high expansion ratio in the present invention, it is suitable to maintain the pressure) of the polypropylene resin (the pressure loss) preferably at 6 to 20 MPa shortly before the delivery apertures of the die plates attached to the free end of the extruder and to release and foam the polypropylene resin with carbon dioxide dissolved in a supercritical state therein under atmospheric pressure. The more preferred pressure loss is 7 to 15 MPa.

A pressure loss lower than 6 MPa is not preferred, because the carbon dioxide dissolved in the supercritical state in the polyolefin-based resin composition tends to evaporate inside the extruder and also inside the die block, foaming takes place inside the die unit, and cell coalescence, excessive cell growth, a reduction in expansion ratio and a substantial deterioration in external attraction occur. On the other hand, a pressure loss higher than 20 MPa is not preferred either, because large shear force tends to apply to cells upon formation of the cells through foaming and cell collapse and the conversion of the cell structure into a non-uniform cell structure take place. Such an incomplete cell structure acts as a large obstacle for the presentation of a good external appearance or thickness uniformity as a foamed board or for the exhibition of high heat-insulation performance as a foamed board.

The above-described tendency is likewise observed when a hydrocarbon-based gas, flon gas or an alternative flon gas is used. The resin pressure shortly before the delivery apertures in the die plates attached to the free end of the extruder is not preferred when it is excessively high or low, and may preferably be 3 to 20 MPa.

The extrusion delivery rate from the extruder may preferably be 1 to 1,000 kg/hr. In particular, the extrusion delivery rate may preferably be about 1 to 50 kg/hr for an extruder of the relatively small screw-diameter type and about 20 to 1,000 kg/hr for an extruder of the relatively large screw-diameter type. If the delivery rate is excessively large or small, a suitable pressure loss can be hardly maintained for the foaming at the tie plates, thereby making it impossible to obtain a foam of a sufficient expansion ratio or resulting in cell collapse. If the delivery rate is large, it is necessary to control the temperature at a level suited for foaming. It may then become necessary to consider a contrivance such as the in-series connection of a still further extruder to the free end of the second-stage extruder in a tandem extruder.

Preferred as the extruder to be used is a tandem extruder constructed basically by combining in series two screws having a screw diameter (Dc) of preferably 30 to 200 mm and an Lc/Dc ratio of 15 to 40 in which Lc represents a screw length. The use of the tandem extruder makes it possible to control the rotational speeds of the individual screws such that a resin pressure loss condition and delivery rate through the die plates, said pressure loss condition and delivery rate being suited for the foaming, can be independently achieved, and also makes it possible to finely adjust the resin temperature such that the properties of the uncrosslinked polyolefin-based resin composition can be fully exhibited. Accordingly, a foam of excellent properties can be produced.

The foam obtained as described above is a foam of coalesced, foamed thermoplastic resin strands, which has an expansion ratio of 10 times or greater, a width (W5) of 500 mm to 2,500 mm, a thickness (D2) of 5 mm or greater and a W5/D2 ratio of 10 or greater. The minimum thickness of the foam is 90% or greater of the maximum thickness of the foam.

It is to be noted that the term "thickness (D2)" as used herein means the average thickness of the foam.

The width (W5) and thickness (D2) of the foam are generally greater than the total width (W1) of all the die plates 4 and the total height (D1 of the delivery apertures, and its W5/D2 is 10 or greater likewise. To adjust the thickness of the foam and to make its thickness uniform, the foam can be pressed in a thickness direction upon obtaining the foam. In this case, W5/D2 becomes greater than W1/D1. Even with an expansion ratio of 10 times or greater, it is still possible to obtain a suitable cell diameter and cell distribution factor. Even with an expansion ratio of 15 times or greater or 20 times or greater, the foam is suited because it has a suitable cell diameter and cell distribution factor, has a large expansion ratio, exhibits sufficient heat performance as a member, has a low specific gravity, can reduce the material cost, and is excellent in heat insulation properties.

EXAMPLES

Examples and Comparative Examples will hereinafter be described to explain the present invention in further detail, although the present invention shall not be limited only to these Examples.

Examples 1-9 and Comparative Examples 1-3

Provided were extruders each of which had a die unit 100 composed of a die block 10 and plural die plates 4. The die block 10 had a multiple bifurcated manifold 2 terminating in plural coat-hanger-shaped flow paths 1 at free ends thereof, and the die plates 4 were arranged corresponding to the coat-hanger-shaped flow paths 1 and had delivery apertures 3 therein. Details of those extruders areas shown in Table 1-1. Using those extruders, foams were produced under the corresponding production conditions shown in Table 1-1 and Table 1-2. Properties of the resultant foams are shown in Table 2. It is to be noted that in Example 3, an elongated die plate 24 having eight groups of delivery apertures 3 in a single plate as depicted in FIG. 5 was employed in place of the combination of eight die plates 4. The total width W3 of the delivery apertures 3 in each group was set equal to the width W2 of each coat-hanger-shaped flow path 1 at the end thereof to determine the positions and ranges of the regions a,a',b (see FIGS. 1 and 2).

TABLE 1-1

| | Ex. 1 | Ex. 2 | Ex. 3 | Ex. 4 | Ex. 5 | Ex. 6 |
|---|---|---|---|---|---|---|
| Details of extruder | | | | | | |
| Number of coat-hanger-shaped flow paths 1 (paths) | 8 | 16 | 8 | 8 | 2 | 2 |
| Bifurcation angle of multiple bifurcated manifold (degrees) | 160 | 160 | 180 | 160 | 160 | 160 |
| Number of die plates (plates) | 8 | 16 | 8 | 8 | 2 | 2 |
| Width of each die plate (W3) (mm) | 200 | 100 | 200 | 200 | 800 | 800 |
| In each Example, the number of rows of delivery apertures in each die plate: 4, the total number of delivery apertures in a width direction across all the die plates: 350, total height (D1): 15.6 mm, total width (W1): 1577 mm. | | | | | | |
| Ranges of the regions a, a' from the corresponding side edges of each die plate (%) | 10 | 10 | 10 | 5 | 10 | 5 |
| Diameters ($\alpha$) of the delivery apertures in the regions a, a' (mm) | 0.61 | 0.61 | 0.61 | 0.63 | 0.61 | 0.63 |
| $\alpha/\beta$ | 1.07 | 1.07 | 1.07 | 1.11 | 1.07 | 1.11 |
| Diameters ($\beta$) of the delivery apertures in the region b (mm) | 0.57 | 0.57 | 0.57 | 0.57 | 0.57 | 0.57 |
| Extrusion conditions | | | | | | |
| Delivery rate of extruder (kg/hr) | 32 | 32 | 32 | 32 | 32 | 32 |
| Feed rate of carbon dioxide (kg/hr) | 1.8 | 1.8 | 1.8 | 1.8 | 1.8 | 1.8 |
| Amount of added carbon dioxide (wt %) | 6 | 6 | 6 | 6 | 6 | 6 |

TABLE 1-1-continued

|  | Ex. 1 | Ex. 2 | Ex. 3 | Ex. 4 | Ex. 5 | Ex. 6 |
|---|---|---|---|---|---|---|
| Resin pressure shortly before die plates (MPa) | 8.4 | 8.2 | 8.2 | 7.9 | 8.7 | 8.5 |
| Maximum production line speed Q shortly after foaming (m/min) | 0.7 | 0.7 | 0.7 | 0.7 | 0.7 | 0.8 |
| Minimum production line speed R shortly after foaming (m/min) | 0.6 | 0.6 | 0.6 | 0.7 | 0.6 | 0.6 |
| R/Q (%) | 89 | 95 | 90 | 97 | 80 | 81 |
| Theoretical delivery rate per delivery aperture (kg/hr) | 0.023 | 0.023 | 0.023 | 0.023 | 0.023 | 0.023 |
| Maximum delivery rate X per delivery aperture (kg/hr) | 0.025 | 0.024 | 0.025 | 0.024 | 0.024 | 0.025 |
| Minimum delivery rate Y per delivery aperture (kg/hr) | 0.021 | 0.022 | 0.022 | 0.022 | 0.019 | 0.019 |
| Y/X (%) | 86 | 92 | 87 | 93 | 78 | 79 |

TABLE 1-2

|  | Ex. 7 | Ex. 8 | Ex. 9 | Comp. Ex. 1 | Comp. Ex. 2 | Comp. Ex. 3 |
|---|---|---|---|---|---|---|
| Details of extruder |  |  |  |  |  |  |
| Number of coat-hanger-shaped flow paths 1 (paths) | 8 | 8 | 8 | 32 | 0 | 0 |
| Bifurcation angle of multiple bifurcated manifold (degrees) | 160 | 160 | 180 | 160 | — | — |
| Number of die plates (plates) | 8 | 8 | 8 | 0 | 1 | 1 |
| Width of each die plate (W3) (mm) | 200 | 200 | 200 | 0 | 1600 | 1600 |

In each Example or Comparative Example, the number of rows of delivery apertures in each die plate: 4, the total number of delivery apertures in a width direction across all the die plates: 350, total height (D1): 15.6 mm, total width (W1): 1577 mm.

|  | Ex. 7 | Ex. 8 | Ex. 9 | Comp. Ex. 1 | Comp. Ex. 2 | Comp. Ex. 3 |
|---|---|---|---|---|---|---|
| Ranges of the regions a, a' from the corresponding side edges of each die plate (%) | 20 | 5 | 5 | 5 | 5 | 5 |
| Diameters ($\alpha$) of the delivery apertures in the regions a, a' (mm) | 0.61 |  | 0.90 | 0.57 | 0.57 | 0.61 |
| $\alpha/\beta$ | 1.07 |  | 1.50 | 1.00 | 1.00 | 1.07 |
| Diameters ($\beta$) of the delivery apertures in the region b (mm) | 0.57 | 0.57 | 0.60 | 0.57 | 0.57 | 0.57 |
| Extrusion conditions |  |  |  |  |  |  |
| Delivery rate of extruder (kg/hr) | 32 | 32 | 32 | 32 | 32 | 32 |
| Feed rate of carbon dioxide (kg/hr) | 1.8 | 1.8 | 1.8 | 1.8 | 1.8 | 1.8 |
| Amount of added carbon dioxide (wt %) | 6 | 6 | 6 | 6 | 6 | 6 |
| Resin pressure shortly before die plates (MPa) | 8.1 | 8.7 | 8.3 | 8.6 | 8.4 | 8.2 |
| Maximum production line speed Q shortly after foaming (m/min) | 0.7 | 0.7 | 0.6 | 0.7 | 0.7 | 0.7 |
| Minimum production line speed R shortly after foaming (m/min) | 0.5 | 0.5 | 0.5 | 0.5 | 0.5 | 0.5 |
| R/Q (%) | 80 | 78 | 83 | 63 | 64 | 71 |
| Theoretical delivery rate per delivery aperture (kg/hr) | 0.023 | 0.023 | 0.023 | 0.023 | 0.023 | 0.023 |
| Maximum delivery rate X per delivery aperture (kg/hr) | 0.025 | 0.023 | 0.026 | 0.026 | 0.025 | 0.051 |
| Minimum delivery rate Y per delivery aperture (kg/hr) | 0.019 | 0.017 | 0.021 | 0.016 | 0.016 | 0.170 |
| Y/X (%) | 78 | 75 | 82 | 60 | 65 | 68 |

In Examples 4, 6 and 9, die plates 14 in each of which boundary regions c,c' were arranged between a center region b and opposite side regions a,a' as illustrated in FIG. 4 were used, the ranges of the boundary regions c,c' were set at from 5 to 10% (Examples 4 and 6) or at from 5 to 20% (Example 9), and the diameters of the delivery apertures in the boundary regions c,c' were set at 0.60 mm (Examples 4 and 6) or 0.65 mm (Example 9).

TABLE 2

| Details of product | Ex. 1 | Ex. 2 | Ex. 3 | Ex. 4 | Ex. 5 | Ex. 6 |
|---|---|---|---|---|---|---|
| Expansion ratio (times) | 31 | 32 | 32 | 32 | 30 | 31 |
| Product width, W5 (mm) | 1620 | 1630 | 1630 | 1630 | 1615 | 1620 |
| Product thickness, D2 (mm) | 15 | 15 | 15 | 15 | 15 | 15 |
| W5/D2 | 109 | 108 | 110 | 109 | 111 | 111 |

TABLE 2-continued

| Maximum product thickness, S (mm) | 15 | 15 | 15 | 15 | 15 | 15 |
|---|---|---|---|---|---|---|
| Minimum product thickness, T (mm) | 13 | 14 | 13 | 14 | 12 | 12 |
| T/S (%) | 92 | 93 | 91 | 96 | 79 | 82 |
| Sheet waviness | B | A | B | A | C | C |
| Sheet smoothness | A | A | A | A | C | B |

| Details of product | Ex. 7 | Ex. 8 | Ex. 9 | Comp. Ex. 1 | Comp. Ex. 2 | Comp. Ex. 3 |
|---|---|---|---|---|---|---|
| Expansion ratio (times) | 32 | 29 | 30 | 21 | 28 | 28 |
| Product width, W5 (mm) | 1625 | 1610 | 1610 | 1554 | 1600 | 1600 |
| Product thickness, D2 (mm) | 15 | 14 | 15 | 14 | 14 | 15 |
| W5/D2 | 111 | 113 | 111 | 114 | 113 | 107 |
| Maximum product thickness, S (mm) | 15 | 15 | 16 | 14 | 15 | 14 |
| Minimum product thickness, T (mm) | 12 | 11 | 13 | 9 | 9 | 10 |
| T/S (%) | 80 | 77 | 81 | 62 | 61 | 70 |
| Sheet waviness | C | C | B | D | D | D |
| Sheet smoothness | B | C | B | D | D | D |

A: Excellent, B: Good, C: Acceptable, D: Unacceptable

In the present invention, the cross-sectional shape of each delivery aperture may preferably be circular in general as described above. Each delivery aperture may, however, have any other appropriate shape such as a square or rectangle. In such a case, α, β and γ do not represent diameters but indicate the cross-sectional areas of the delivery apertures, the lengths of one sides (squares), or the lengths of diagonals (rectangles).

The term "the total width (W1) of all the die plates" as used herein does not mean the total value of the widths of the individual die plates, but means the total value of the widths of areas, within which the delivery apertures are formed, in the individual die plates (For the meaning of "areas" as used in this context, reference can be made to the total height (D1) in FIG. 2). Similarly, the term "the width (W3) of each die plate" does not mean the width of each die plate itself, but means the width of an area, within which the delivery apertures are formed, in each die plate.

In the foregoing, the diameters of the delivery apertures in each region of each die plate were set identical to each other. The diameters of the delivery apertures in each die plate may, however, be set such that they gradually increase from a central vertical axis of the die plate toward the opposite side edges of the die plate.

In the die plates shown in the figures, the delivery apertures are arranged in vertical and horizontal arrays. However, these delivery apertures may be arranged in plural arrays in only a vertical or horizontal direction, that is, in only vertical or horizontal, plural arrays.

The invention claimed is:

1. A process for producing a wide thermoplastic resin foam having a width to thickness ratio of at least 100, comprising:
    feeding a molten foamable thermoplastic resin through a manifold having multiple symmetrically bifurcated flow paths that terminate in a plurality of coat-hanger-shaped flow paths at downward ends thereof,
    extruding the molten foamable thermoplastic resin as foamed strands through delivery apertures formed in a plurality of die plates, the die plates being disposed at downward ends of the plurality of coat-hanger-shaped flow paths and arranged corresponding to said respective coat-hanger-shaped flow paths, and
    coalescing said foamed strands together, wherein:
    in each of said plurality of die plates, the delivery apertures disposed on opposite side regions have a diameter (α) and the delivery apertures disposed in a center region of each die plate have a diameter (β), whereby (α) is greater than (β), and so as to provide a uniform flow rate of the molten foamable thermoplastic resin in a width direction on downstream sides of said coat-hanger-shaped flow paths,
    wherein said plurality of die plates satisfy the following condition whereby: W1/D1>100, where D1 is a total height of the delivery apertures for each die plate and W1 is a total width of the die plates,
    wherein in each of said die plates, the ratio (α/β) of the diameter (α) of said delivery apertures in said opposite side regions to the diameter (β) of said delivery apertures in said center region is 1.05 to 1.40, and
    wherein in each of said die plates, said delivery apertures in said opposite side regions are located within ranges of 30%, based on a width of said die plate, from opposite side edges of said die plate.

2. A process according to claim 1, wherein in each of said die plates, the percentage of a minimum resin delivery rate per delivery aperture based on a maximum resin delivery rate per delivery aperture is 80% to 100%.

3. A process according to claim 1, wherein in each of said die plates, said delivery apertures are arranged in horizontal arrays.

4. A process according to claim 1, wherein in each of said die plates, boundary regions are arranged between said opposite side regions and said center region, respectively, and the delivery apertures in said opposite side regions, the delivery apertures in said boundary regions and the delivery apertures in said center region satisfy the following equation:

$$\alpha > \gamma > \beta$$

wherein
    α: Diameter of said delivery apertures in said opposite side regions,
    β: Diameter of said delivery apertures in said center region, and
    γ: Diameter of said delivery apertures in said boundary regions.

5. The process according to claim 1, wherein the number of die plates is equal to the number of coat-hanger-shaped flow paths.

6. The process according to claim 1, wherein the total width (W1) of the of die plates is about 500 to 2,500 mm.

7. The process according to claim 1, wherein a width of each coat-hanger-shaped flowpath at a downstream end is about 130 to 450 mm.

8. The process according to claim 1, wherein an inlet angle of each coat-hanger-shaped flowpath is about 90 to 180 degrees.

9. The process according to claim 1, wherein the delivery apertures are arranged in a lattice-like pattern.

10. The process according to claim 1, wherein the delivery apertures are arranged in a honeycomb pattern.

11. The process according to claim 1, wherein a cross-sectional shape of the delivery apertures are one of a circle, a square and a rectangle.

12. The process according to claim 1, wherein the extruding step is performed at a temperature of 160° to 250° C.

13. The process according to claim 1, wherein the molten foamable thermoplastic resin is maintained at a pressure of 6 to 20 MPa before being fed into the delivery apertures.

* * * * *